United States Patent
Nakaya et al.

(10) Patent No.: US 8,117,756 B2
(45) Date of Patent: Feb. 21, 2012

(54) BUSH CUTTER

(75) Inventors: Tomomi Nakaya, Wako (JP); Hiromi Yuzuriha, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 625 days.

(21) Appl. No.: 12/251,914

(22) Filed: Oct. 15, 2008

(65) Prior Publication Data

US 2009/0094841 A1   Apr. 16, 2009

(30) Foreign Application Priority Data

Oct. 15, 2007   (JP) ............................... P2007-268022

(51) Int. Cl.
*A01G 3/06* (2006.01)
*A01D 34/412* (2006.01)
(52) U.S. Cl. ............................ 30/276; 30/296.1; 30/347
(58) Field of Classification Search .................... 30/276, 30/296.1, 297, 298, 298.4, 347, 277.4, 312, 30/275.4, 122; 173/162.2; 56/10.1, 12, 7; 172/14

See application file for complete search history.

(56) References Cited

U.S. PATENT DOCUMENTS

| 3,540,123 | A |   | 11/1970 | Yamada |
|---|---|---|---|---|
| 4,696,108 | A |   | 9/1987 | Zerrer et al. |
| 5,364,307 | A | * | 11/1994 | Shaulis ........................ 464/52 |
| 6,006,434 | A | * | 12/1999 | Templeton et al. .......... 30/296.1 |
| 6,053,259 | A | * | 4/2000 | Kojima et al. ................ 173/30 |
| 2002/0116825 | A1 |   | 8/2002 | Jarzombek |
| 2002/0121262 | A1 | * | 9/2002 | Kawamoto et al. ...... 123/196 W |
| 2006/0179806 | A1 | * | 8/2006 | Maier et al. .................. 56/12.7 |

FOREIGN PATENT DOCUMENTS

| DE | 196 16 764 A1 |   | 11/1997 |
|---|---|---|---|
| GB | 2028624 | * | 3/1980 |
| JP | 30-11418 |   | 8/1955 |
| JP | 2002-354921 A |   | 12/2002 |
| JP | 2002-354922 A |   | 12/2002 |
| JP | 2004065072 A |   | 3/2004 |

* cited by examiner

*Primary Examiner* — Phong Nguyen
(74) *Attorney, Agent, or Firm* — Arent Fox, LLP

(57) ABSTRACT

A bush cutter for performing weed-cutting operations while suspended from the shoulders of an operator. The bush cutter is provided with an operating rod and an operating handle, which is provided midway along the operating rod in the longitudinal direction. The rearward rod-half of the operating rod between the operating handle and a motor has a curved part that curves laterally.

4 Claims, 7 Drawing Sheets

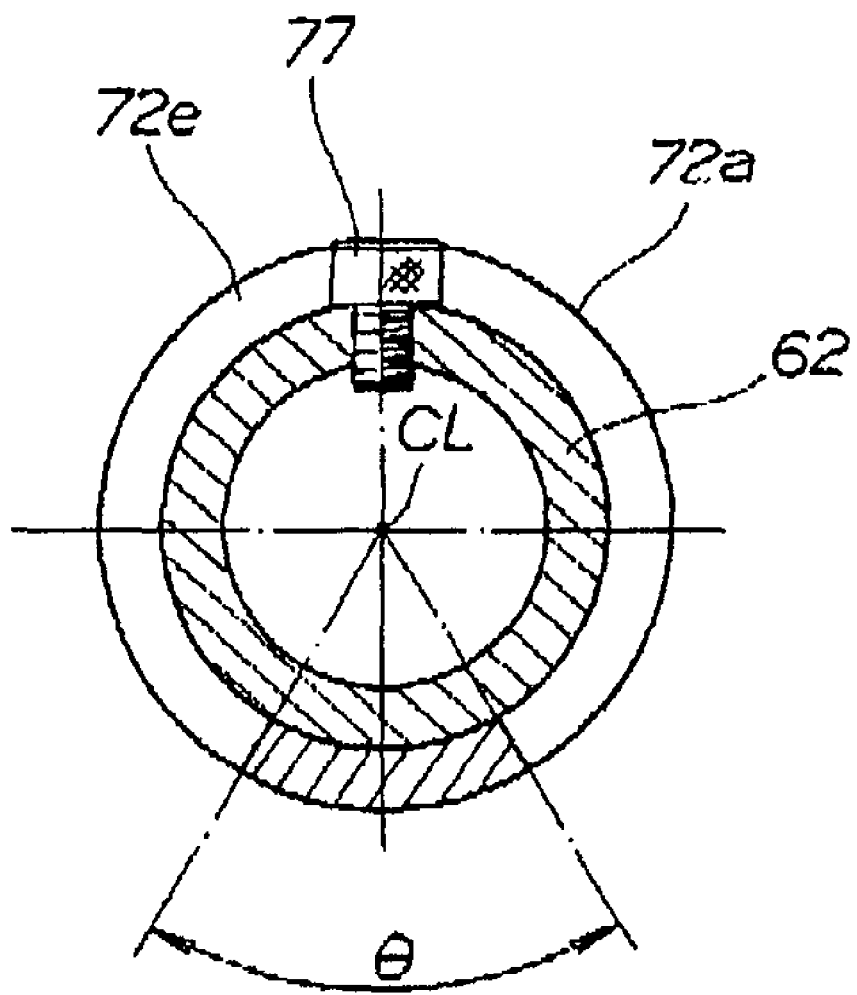

BUSH CUTTER

CROSS REFERENCE TO RELATED APPLICATION

This application claims the priority of Japanese Application No. P2007-268022, filed Oct. 15, 2007 the entire specification, claims and drawings of which are incorporated herewith by reference.

FIELD OF THE INVENTION

The present invention relates to a bush cutter of a model in which the operator performs an operation while the bush cutter is suspended from the shoulder.

BACKGROUND OF THE INVENTION

Weeds that grow in, e.g., the spaces between fields readily serve as nests for pests, and therefore operations for cutting these weeds must often be performed, particularly during the period in which the weeds are growing. This operation involves heavy labor, and therefore a variety of work machines have been proposed and put into use. Bush cutters are work machines that are small-sized and readily used, and are therefore widely employed. Typical bush cutters have a rotating shaft passing through a pipe-shaped operating rod and use a motor provided to the rearward end of the operating rod to cause the rotating shaft to rotate, whereby a cutting blade provided to the forward end of the operating rod is made to rotate. The operator suspends the bush cutter from one shoulder so that the operating rod extends diagonally forwards along the hips (the lateral part) of the body, grips the operating handle provided to the middle of the operating rod, and sweeps the operating rod up, down, left, and right, whereby the cutting blade cuts the weeds.

In order to lighten the burden on the operator and increase the efficiency of the operation, the cutting blade is preferably oriented in front of the body so that left and right sweeping motions of the body are limited to the extent possible, and leaning movements are eliminated during the bush-cutting operation. However, the operating rod interferes with the body of the operator in most bush cutters. Brush cutters in which the operating rod does not interfere with the body of the operator are accordingly well-known, as disclosed in Japanese Utility Model Application Post0-Exam Publication No. 30-11418 (JP-U 30-11418 B), Japanese Patent Application Laid-Open Publication No. 2002-354921 (JP 2002-354921 A), and Japanese Patent Application Laid-Open Publication No. 2002-354922 (JP 2002-354922 A).

The bush cutter disclosed in JP-U 30-11418 B is a detached model in which the engine for rotating the cutting blade is detached. The engine is borne on the back of the operator, and the operator cuts rice plants, wheat, and the like while grasping the rearward end of the operating rod in front of the body, extending the operating rod forward, and sliding the forward-end portion of the operating rod on the ground. The bush cutter disclosed in JP-U 30-11418 B is thus not a model in which the operator performs operations while the operating rod is suspended from the shoulder. In other words, the bush cutter of JP-U 30-11418 B is used by sliding the forward-end portion of the operating rod along the ground and is therefore not appropriate for bush-cutting operations in sloping or uneven locations.

The bush cutters disclosed in JP 2002-354921 A and JP 2002-354922 A are models in which the operator performs operations while the operating rod is suspended from the shoulder. The operating rod is a folding type composed of a forward-half part to which the cutting blade and a cutting-drive motor are provided, and a rearward-half part to which a motor battery is provided. The forward end of the rearward-half part can be tilted laterally relative to the rearward end of the forward-half part that has the operating handle. The operator grasps the operating handle in front of the body and extends the forward-end part forward, whereby the cutting blade can be oriented in front of the body. However, the rearward-half part interferes with the body in this position, and the rearward-half part is therefore tilted laterally in the non-interfering range.

However, the heavy battery of the aforedescribed bush cutter is offset to the left or right relative to the forward-half part. The center of gravity of the bush cutter is therefore offset to the left or right relative to the width-wise center of the body of the operator, and therefore the lateral weight balance of the bush cutter relative to the body is inadequate. Further improvements are therefore possible in order to lighten the burden on the operator and increase the efficiency of the operation.

SUMMARY OF THE INVENTION

It is an object of the present invention to provide technology for a bush cutter of a model in which the operator performs operations while the bush cutter is suspended from the shoulder, in which the burden on the operator is lightened, and the efficiency of the operation is increased.

According to one aspect of the present invention, there is provided a bush cutter comprising: an operating rod; a motor attached to a rearward end of the operating rod; a cutting blade adapted to be rotationally driven by the motor, the cutting blade being attached to a forward end of the operating rod; and an operating handle provided midway along the operating rod in a longitudinal direction, wherein the operating rod on a portion located between the operating handle and the motor has a curved part that is formed to curve laterally, and the curved part is designed to be of such size that no interference occurs with a body of an operator when the cutting blade and the operating handle are positioned in front of the operator, and the motor is positioned directly behind the operator.

The operating rod can be brought nearer the width-wise center of the body by the amount to which the curved part circles around the body when the operator performs operations while the bush cutter is suspended from the shoulders. The cutting blade can be oriented in front of the body by bringing the operating rod close to the width-wise center. Bringing the operating rod, which extends forwards and backwards, nearer the width-wise center of the body, and orienting the cutting blade in front of the body brings the center of gravity of the bush cutter nearer the width-wise center of the body. As a result, the bush cutter can be have better lateral balance relative to the body. The operating rod can also be evenly swept to the left and right, where the vicinity of the center of the body is the pivot axis. The bush cutter is well-balanced laterally relative to the body, and the operating rod can be readily swept left and right; therefore the operator can perform bush-cutting operations while maintaining a very natural standing work posture. Therefore, the burden on the operator is further lightened, and the efficiency of the operation can be further increased.

The operating rod, which extends forwards and backwards, is brought nearer the width-wise center of the body, whereby the operator merely employs a left-right sweeping motion of the body during the bush cutting operation. The efficiency of the operation can therefore be still further increased.

When kickback occurs during the bush-cutting operation, the recoil of the kickback causes the operating rod to pivot left or right around the vicinity of the center of the body as the pivot axis. Since the operating rod pivots about the vicinity of the center of the body, the operator can receive the recoil of the kick back using the entire body. Furthermore, since the operating rod pivots about the vicinity of the center of the body, the cutting blade will not readily approach the body. Kickback occurs when, e.g., the rotating cutting blade contacts rocks, fallen trees, or other hard objects protruding from the soil, and the cutting blade rebounds.

Preferably, the curved part is designed so that a center line of the bush cutter passing through the motor and the cutting blade is substantially aligned with a width-wise center of the body of the operator. The operating rod, the cutting blade, and the operating handle can therefore be positioned directly in front of the body of the operator, and the operating rod can be more evenly swept to the left and right, with the center of the body used as the pivot axis. The efficiency of the bush-cutting operation can therefore be still further increased.

Desirably, the operating rod has a two-segment configuration comprising a forward rod-half to which the cutting blade is provided and a rearward rod-half to which the motor is provided, where the forward rod-half is provided with the operating handle and is rotatably linked to the rearward rod-half via a joint. The joint may be attached to either the forward rod-half or the rearward rod-half. The operator can therefore freely rotate only the forward rod-half and the cutting blade by rotating left or right the operating handle provided to the forward rod-half. The forward rod-half and the cutting blade alone can thus be rotated without rotating the rearward rod-half to which the motor is provided, and therefore the cutting blade can be readily tilted according to ground features. As a result, the efficiency of the operation can be still further increased.

In a preferred form, the operating handle has a gripping part able to be gripped by both hands separated by substantially the same distance as a shoulder width of the operator. The center of the operating rod is at the width-wise center of the body of the operator, and therefore the operator need not move the operating handle while both hands are spread far apart. The operator can hold the gripping part of the operating handle and sweep the operating rod up, down, left, and right while maintaining a comfortable posture in which both hands are separated by substantially the same distance as the shoulder width. The operability of the bush cutter is therefore ensured, while the burden on the operator is lightened. When kickback occurs, the operator can hold the gripping part of the operating handle and readily absorb the recoil of the kick back even while maintaining a comfortable posture in which both hands are separated by substantially the same distance as the shoulder width.

The operating rod preferably has a pair of left and right shoulder belts for hanging on both shoulders of the operator, the pair of the left and right shoulder belts being suspended between a rearward part and a part more rearward than the operating handle of the operating rod. Having the pair of left and right shoulder belts hung from both shoulders of the operator allows operations to be performed while the bush cutter is suspended. Since the center of the operating rod is located in the width-wise center of the body of the operator, the weight of the bush cutter is distributed equally on both of the shoulders of the operator via the pair of left and right shoulder belts. Since the weight of the bush cutter can be borne equally by both of the shoulders, the burden on the operator can be lightened further, and operability improves.

BRIEF DESCRIPTION OF THE DRAWINGS

Certain preferred embodiments of the present invention will be described in detail below, by way of example only, with reference to the accompanying drawings, in which:

FIG. 7 is a cross-sectional view taken along line 7-7 of FIG. 5.

DETAILED DESCRIPTION OF THE PREFERRED EMBODIMENTS

Figure 1:
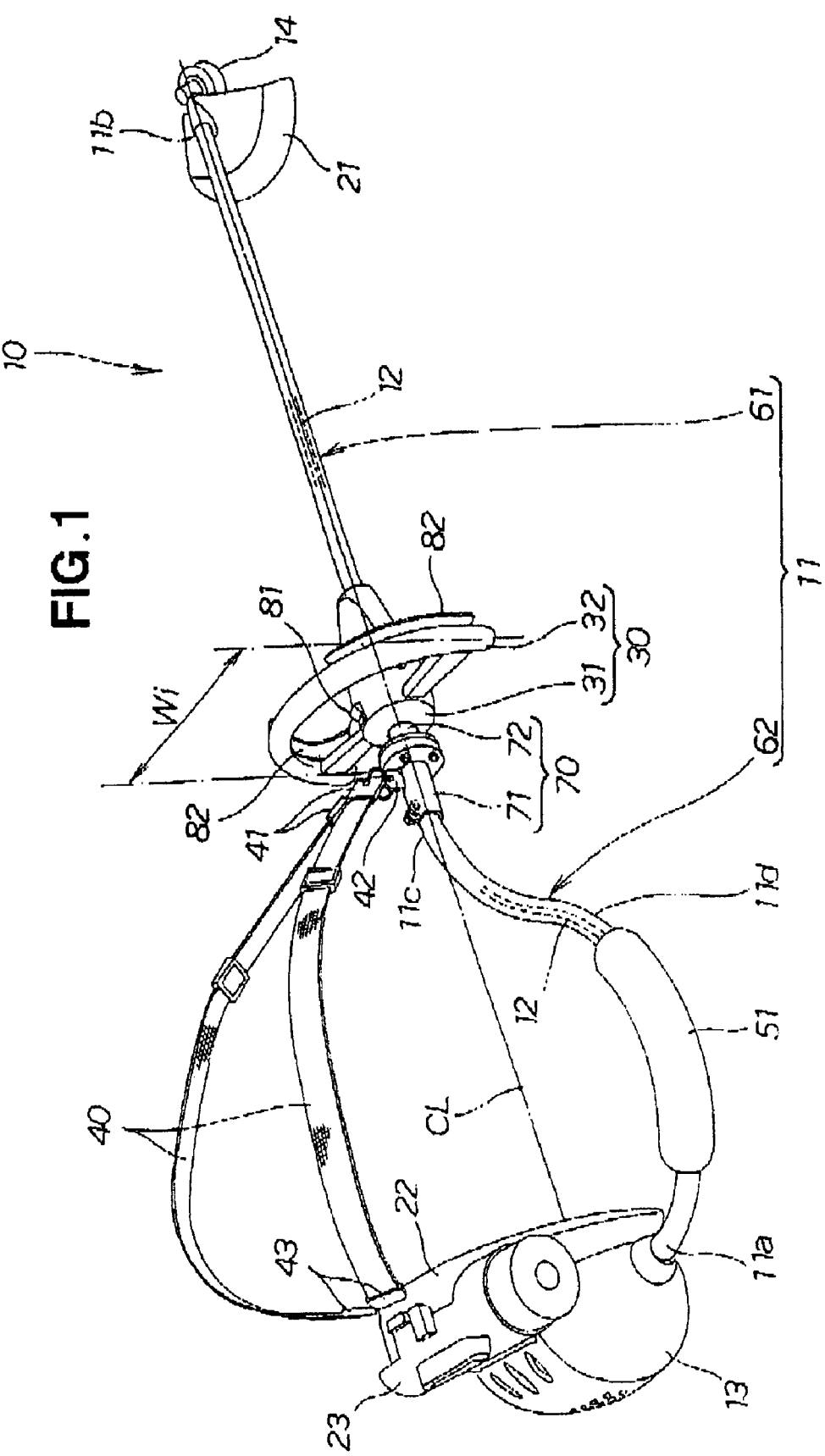
FIG. 1 is a perspective view showing a bush cutter according to the present invention.
Figure 2:
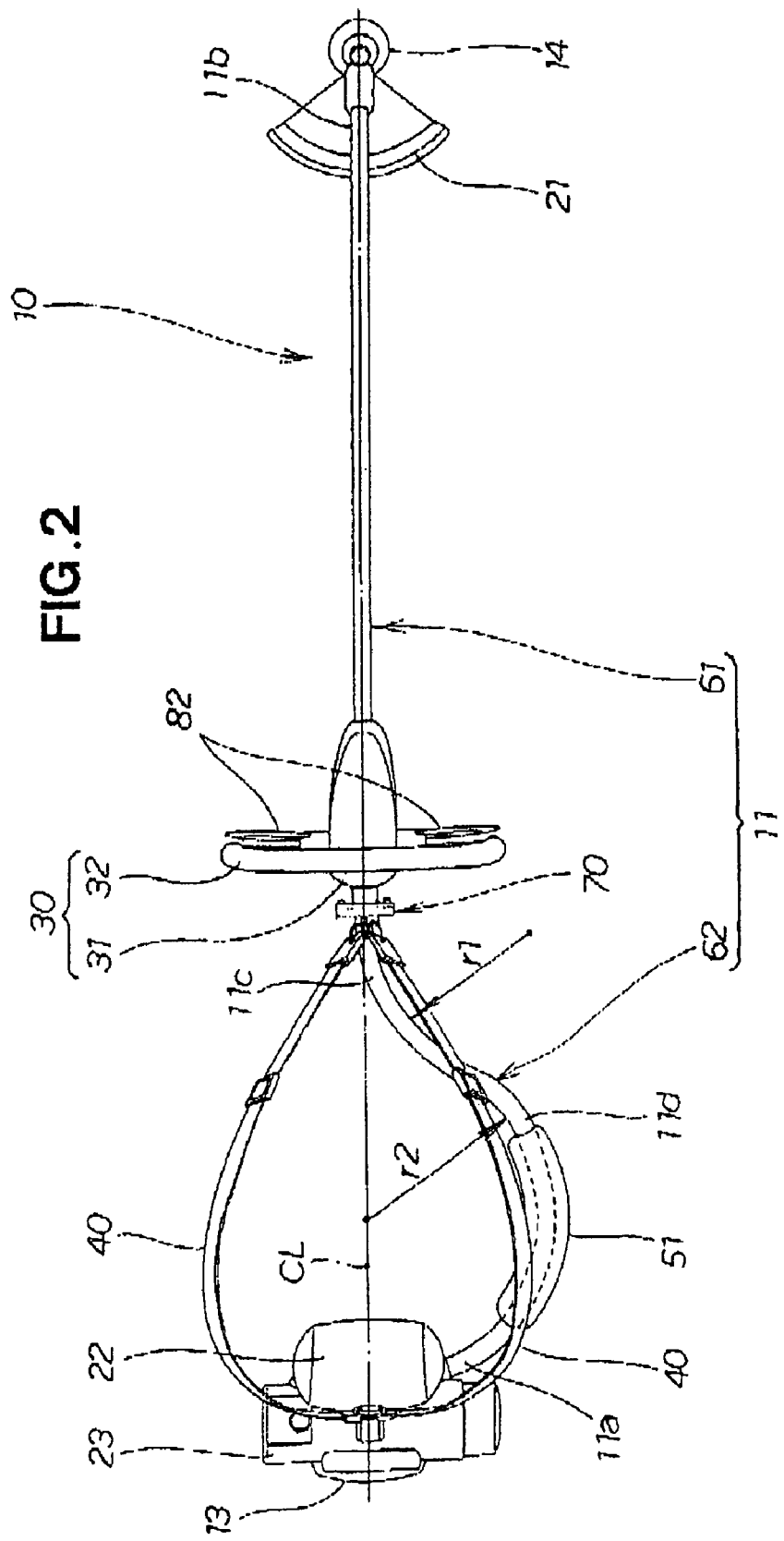
FIG. 2 is a top plan view showing the bush cutter of FIG. 1.

As shown in FIGS. 1 and 2, in a bush cutter 10, a rotating shaft 12 is passed through a pipe-shaped operating rod 11, and a motor 13 provided to a rearward end 1a of the operating rod 11 is driven, whereby a cutting blade 14 provided to a forward end 11b of the operating rod 11 is made to rotate. The operating rod 11 is provided with a cover 21 for covering the rearward half of the cutting blade 14. The rotating shaft 12 is composed of a flexible shaft. The motor 13 is composed of an engine.

A line CL that passes through the motor 13 and the cutting blade 14 will be referred to as the center line CL of the bush cutter 10.

The motor 13 has a pedestal 22 on a surface facing the cutting blade 14. The pedestal. 22 is provided with a housing part 23 in which are housed an air cleaner and a carburetor (not shown) for the motor 13.

Figure 3:
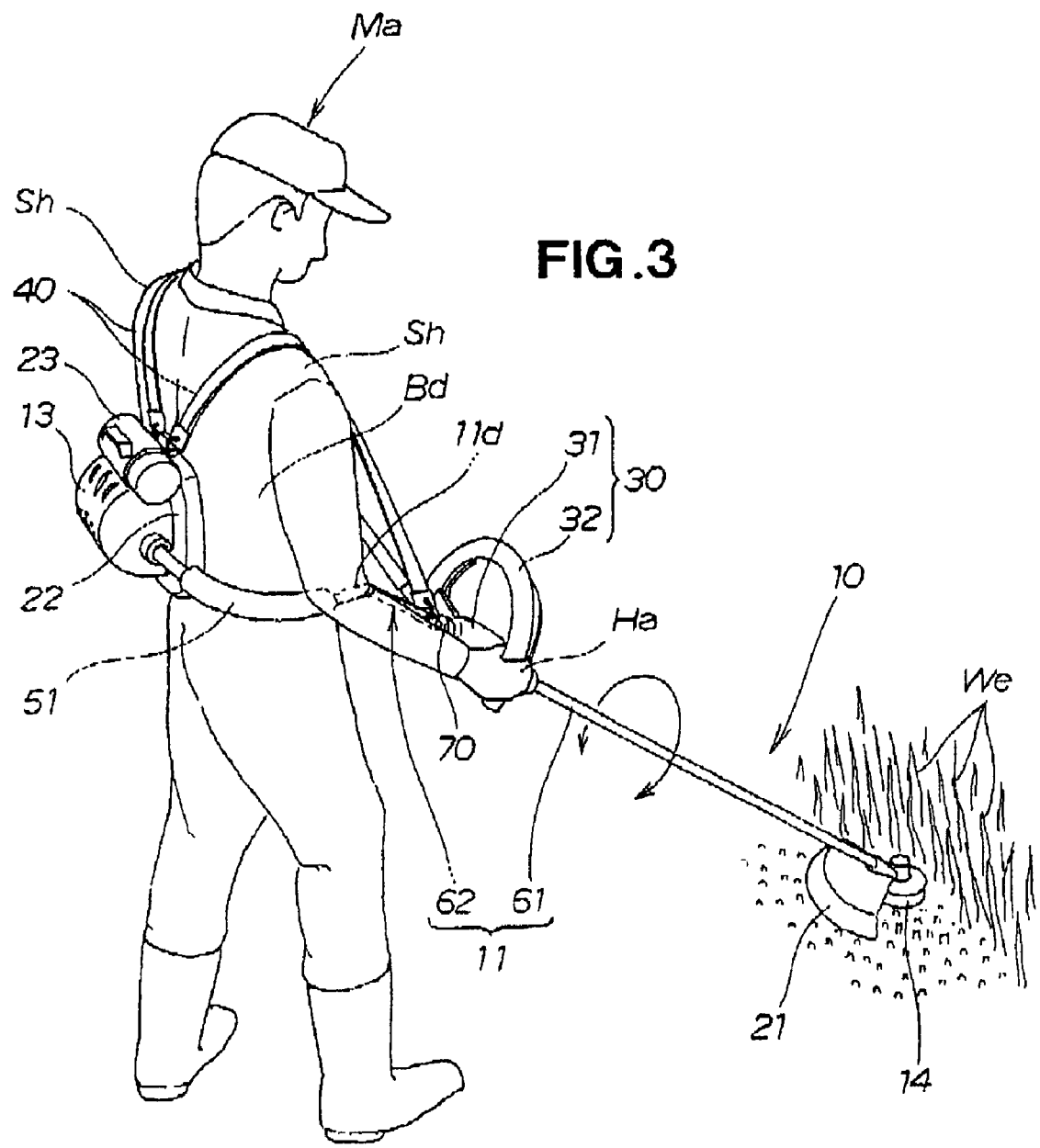
FIG. 3 is a perspective view showing the bush cutter of FIG. 1 in a state of use.

The operating rod 11 is provided with an operating handle 30 in the middle in the longitudinal direction and also has a pair of left and right shoulder belts 40, 40 for hanging on both shoulders Sh, Sh of an operator Ma shown in FIG. 3. Forward-end parts 41, 41 of the left and right shoulder belts 40, 40 are attached by a hook 42 to a part 11c that is farther to the rear than the operating handle 30 of the operating rod 11, as shown in FIG. 1. Rearward-end parts 43, 43 of the left and right shoulder belts 40, 40 are attached to an upper part on the pedestal 22 of the motor 13. The left and right shoulder belts 40, 40 are thus provided between the rearward-end part (i.e., the pedestal 22 of the motor 13) and the part 11c that is farther to the rear than the operating handle 30 of the operating rod 11. The aforedescribed bush cutter 10 is of a model in which the operator Ma performs operations while the bush cutter is suspended from the shoulders Sh, Sh.

Figure 4:
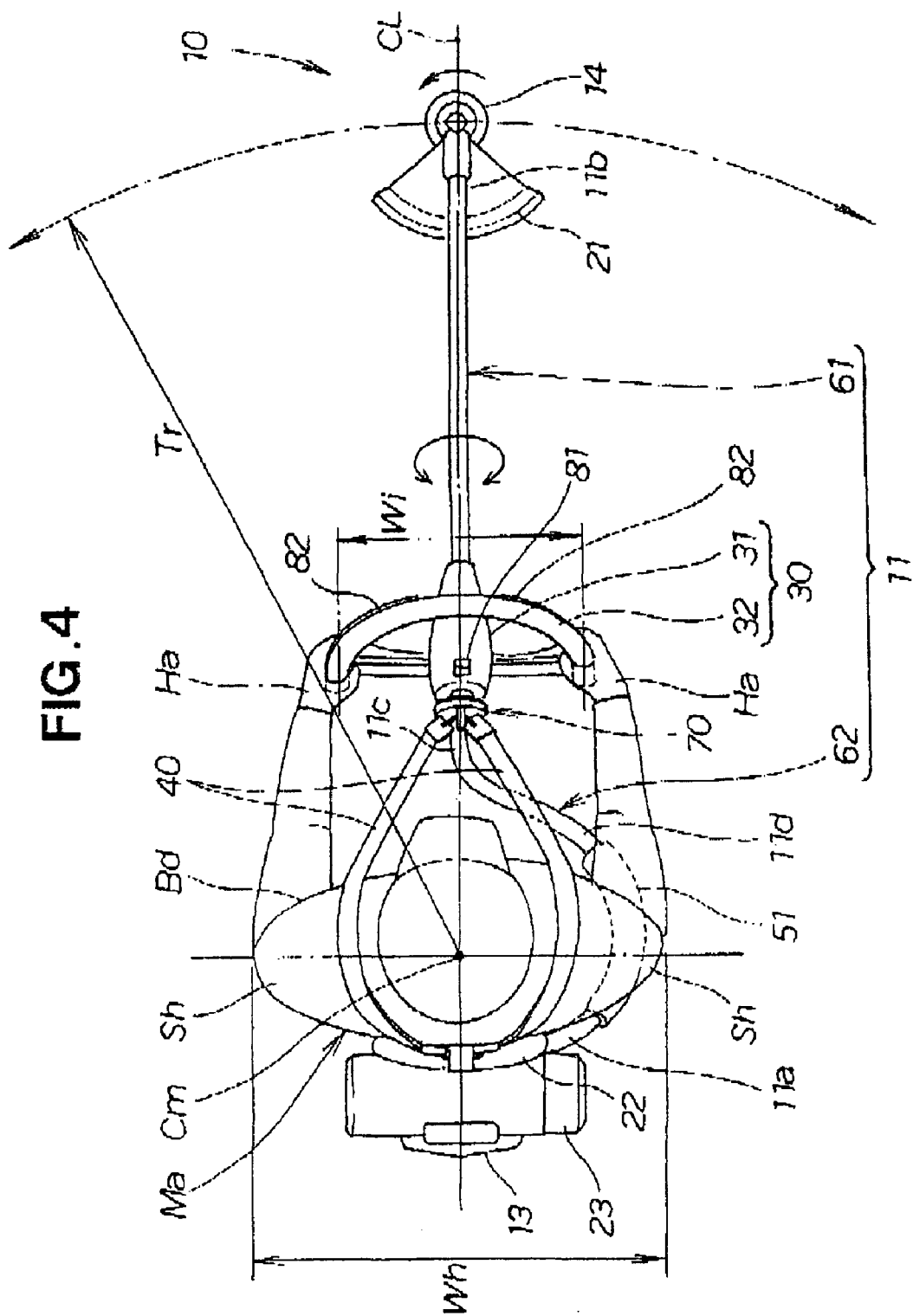
FIG. 4 is a top plan view showing the bush cutter of FIG. 1 in a state of use.

The portion between the operating handle 30 and the motor 13 of the operating rod 11 is formed into a curved part 11d that is curved laterally from the center line CL of the bush cutter 10, as shown in FIGS. 1 and 2. This curved part 11d is curved along the hips (the lateral part) of the body Bd of the operator Ma, as shown in FIGS. 3 and 4. In other words, when viewed from above the bush cutter 10 as shown in FIG. 2, the curved part 11d of the operating rod 11 is formed in an arcuate shape curved laterally and separated by a radius r1 from the portion 11c, which is farther to the rear than the operating handle 30, and is formed in an arcuate shape having a radius r2 centered above the center line CL of the bush cutter 10. The curved part 11d has a cushion part 51 on the portion corresponding to the position of the hips on the body Bd of the operator Ma.

The size of the curved part 11d is set as follows. When the cutting blade 14 and the operating handle 30 are positioned in front, e.g., directly in front, of the operator Ma, and the motor 13 is positioned directly to the rear of the operator Ma, as shown in FIGS. 2 and 4, the size of the curved part 11d is set so as to not interfere with the body Bd of the operator Ma. To be more specific, the curved part 11d is designed to a size (radius r2) permitting substantial alignment with the center line CL of the bush cutter 10 relative to a width-wise center Cm of the body Bd of the operator Ma.

As shown in FIG. 1, the operating rod 11 has a two-segment configuration composed of a forward rod-half 61, to which the cutting blade 14 is provided, and a rearward rod-half 62, to which the motor 13 is provided. The forward rod-half 61 is rotatably linked to the rearward rod-half 62 via a joint 70.

Figure 5:
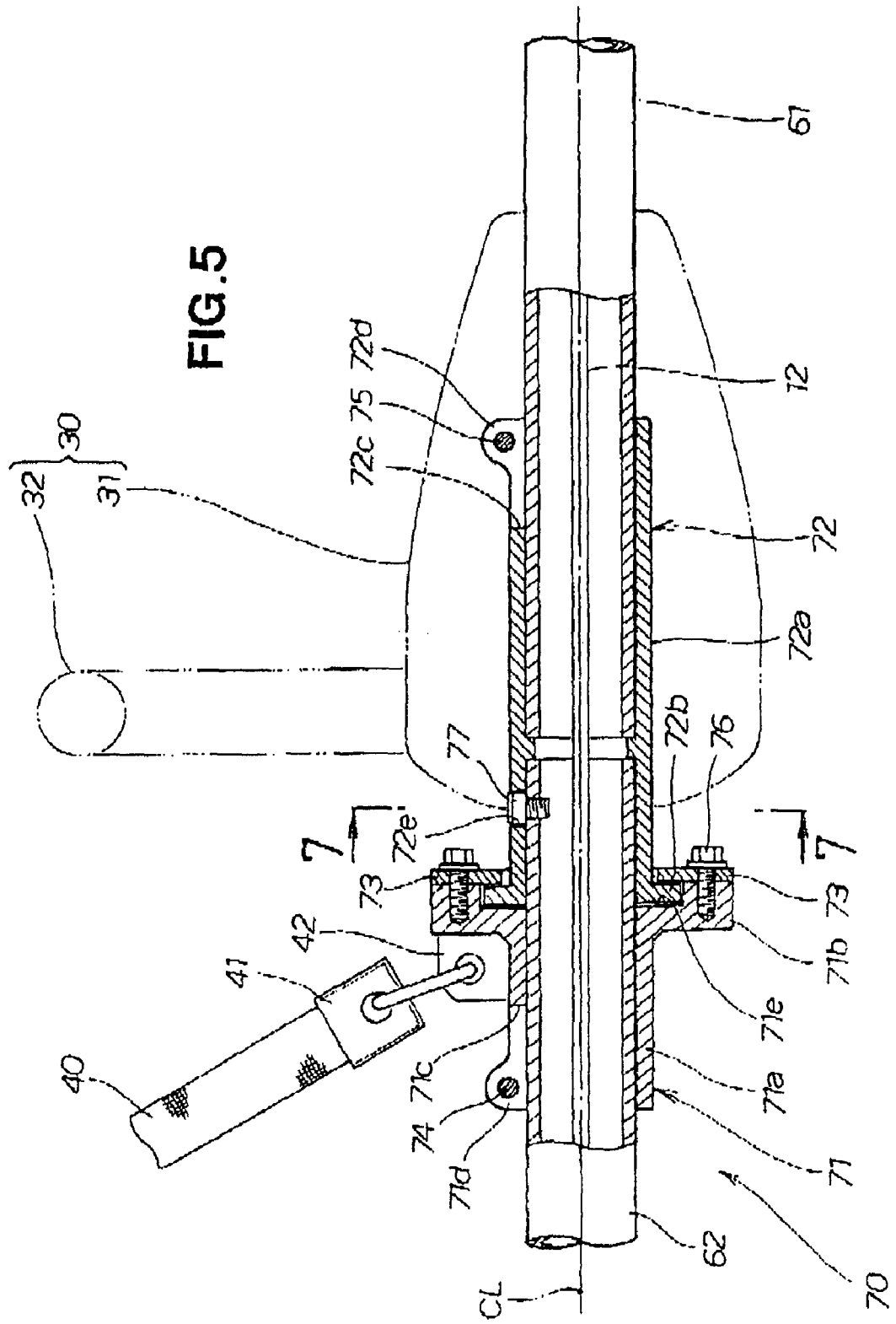
FIG. 5 is a cross-sectional view showing a joint of FIG. 1.
Figure 6:
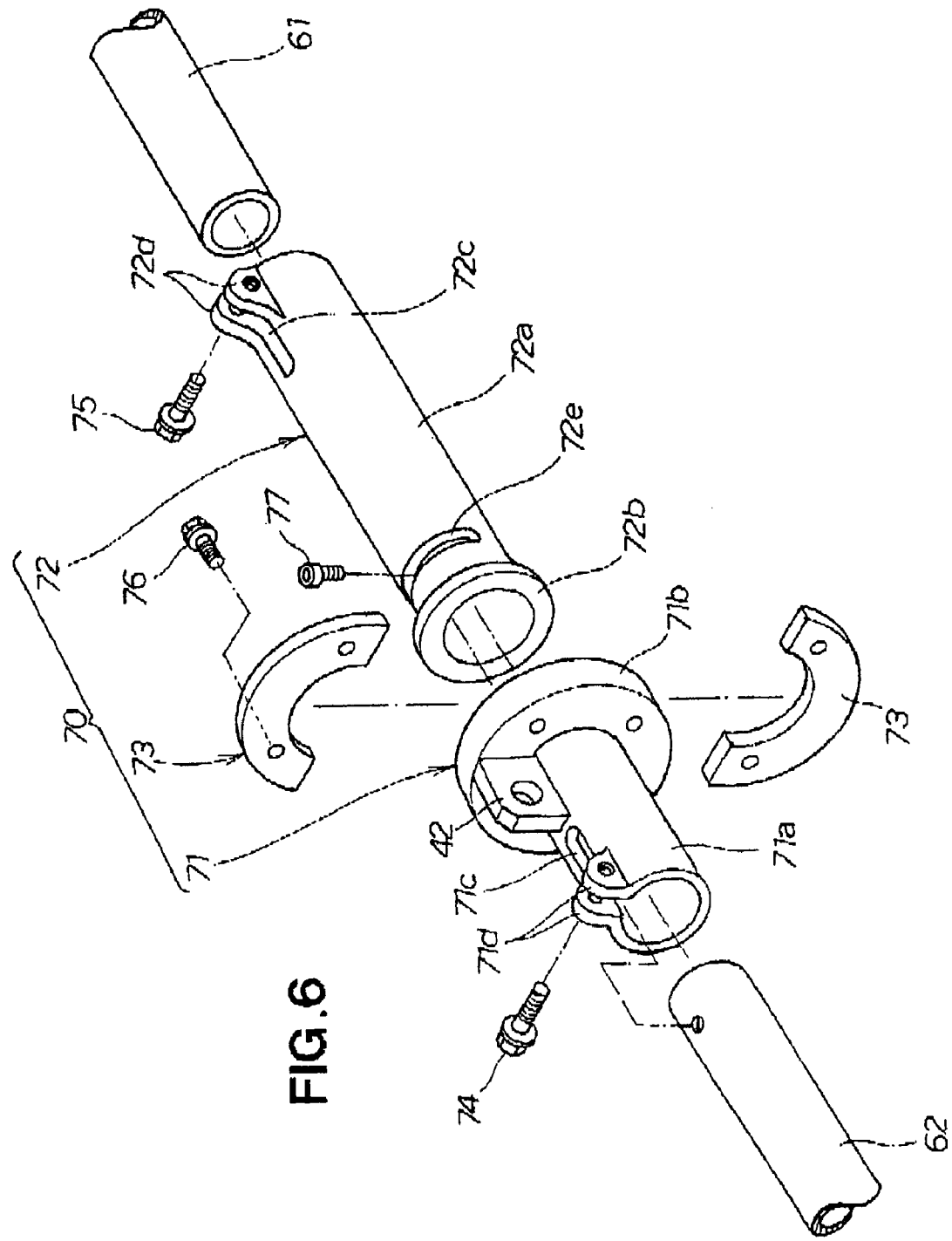
FIG. 6 is a exploded perspective view of the joint of FIG. 5.

The joint 70 will be described below on the basis of FIGS. 5 through 7.

The joint 70 is composed of a first joint part 71 for attaching to the rearward rod-half 62, a second joint part 72 for attaching to the forward rod-half 61, and a linking part 73 for linking the first joint part 71 and the second joint part 72.

The first joint part 71 is composed of a tube-part 71a, through which passes the forward-end part of the rearward rod-half 62, and a forward flange 71b on the forward end of the tube-part 71a. The tube-part 71a has a slit 71c cut out in the longitudinal direction and a pair of flanges 71d, 71d provided on either side of the slit 71c. After the rearward rod-half 62 is inserted into the tube-part 71a, the flanges 71d, 71d on either side of the slit 71c are fastened by a bolt 74, whereby the first joint part 71 can be attached to the rearward rod-half 62. The forward-end portion of the rearward rod-half 62 protrudes forward a set distance from the tube-part 71a.

The second joint part 72 is composed of a tube-part 72a, through which passes the rearward-end part of the forward rod-half 61, and a rearward flange 72b on the rearward end of the tube-part 72a. The tube-part 72a has a slit 72c cut out in the longitudinal direction and a pair of flanges 72d, 72d provided on either side of the slit 72c. After the forward rod-half 61 is fit into the tube-part 72a, the flanges 72d, 72d on either side of the slit 72c are fastened by a bolt 75, whereby the second joint part 72 can be attached to the forward rod-half 61.

The joint 70 links the forward rod-half 61 and the rearward rod-half 62 as described below.

The forward-end portion of the rearward rod-half 62 that protrudes forward from the first joint part 71 is first inserted into the tube-part 72a of the second joint part 72. The rearward flange 72b is then rotatably fitted into a concave part 71e (FIG. 5) formed on the forward surface of the forward flange 71b. Finally, the linking part 73 is covered by the forward surface of the forward flange 71b and immobilized by a bolt 76. As a result, the second joint part 72 is rotatably linked to the first joint part 71 so that motion in the axial direction is limited. The forward rod-half 61 is therefore rotatably linked to the rearward rod-half 62 via the joint 70. The linking part 73 is an annular plate divided into two segments in the radial direction.

The forward rod-half 61 is configured so as to rotate within a set angle relative to the rearward rod-half 62. Specifically, the rearward rod-half 62 has a guide pin 77 on the forward-end portion extending forward from the first joint part 71. The guide pin 77 is a member that protrudes from the rearward rod-half 61 in the radial direction and is, e.g., screwed onto the rearward rod-half 62.

The second joint part 72 has a guide slit 72e formed in the circumferential direction on the tube-part 72a. The guide slit 72e fits to the guide pin 77 and is open for, e.g., 300° in the circumferential direction of the tube-part 72a. In other words, an angle θ (FIG. 7) is all that remains of the tube-part 72a. The range of possible change in the rotational angle of the forward rod-half 61 relative to the rearward rod-half 62 is the range in which the guide slit 72e is guided by the guide pin 77.

The tube-part 71a has the hook 42 for attaching the forward-end parts 41, 41 of the shoulder belts 40, 40.

As shown in FIGS. 1 and 4, the operating handle 30 is a loop handle composed of a hub 31, which is attached to the forward rod-half 61, and a loop-shaped gripping part 32, which is formed integrally with the hub 31.

The hub 31 is attached to the second joint part 72 and to the forward rod-half 61. As a result, the operating handle 30 and the joint 70 are both provided to the forward rod-half 61. The hub 31 may also be provided integrally with the second joint part 72; e.g., the second joint part 72 may also act as the hub 31.

The gripping part 32 is composed of the upper half of a ring centered around the center line CL of the bush cutter 10, The gripping part 32 is set to have a size Wi (radius Wi of the gripping part 32) that allows the gripping part to be gripped by both hands Ha, Ha separated by substantially the same distance as a shoulder width Wh of the operator Ma.

The gripping part 32 of the operating handle 30 is thus configured to allow gripping by both hands Ha, Ha separated by substantially the same distance as the shoulder width Wh of the operator Ma in this embodiment. The center CL of the operating rod 11. (the center line CL of the bush cutter 10) is at the width-wise center Cm of the body Bd of the operator Ma, and therefore the operator Ma need not move the operating handle 30 while the hands Ha, Ha are spread far apart.

The operator Ma can hold the gripping part 32 of the operating handle 30 and sweep the operating rod 11 up, down, left, and right while maintaining a comfortable posture in which both hands Ha, Ha are separated by substantially the same distance as the shoulder width Wh. The operability of the bush cutter 10 is therefore ensured, while the burden on the operator Ma is lightened. When kickback occurs, the operator Ma can hold the gripping part 32 of the operating handle 30 and readily absorb the recoil of the kick back even while maintaining a comfortable posture in which both hands Ha, Ha are separated by substantially the same distance as the shoulder width Wh.

The hub 31 is provided with a main switch 81 and a pair of left and right throttle levers 82, 82. The operator Ma can use the hands Ha gripping the gripping part 32 to operate the throttle levers 82 and adjust the output of the motor 13.

A conventional, general bush cutter will now be considered.

Conventional bush cutters are used as follows. The operator extends an operating rod diagonally forward along the hips (the lateral part) of the body, with the bush cutter suspended from one shoulder. An operating handle provided to the middle of the operating rod is swept up, down, left, and right, whereby weeds are cut by the cutting blade.

There are three types of operating handles: bar handles, grip handles, and loop handles. Bar handles are bar-shaped and extend left and right from the longitudinal middle of the operating rod. Loop handles are loop-shaped and are provided to the longitudinal middle of the operating rod. Grip handles are grip-shaped so that the operating rod is grasped directly.

Bar handles extend from the operating rod in the horizontal direction, and therefore the width of the handle is large. Bush cutters in which bar handles are employed are therefore appropriate for brush-cutting operations in flat terrain, foot paths, and a variety of other terrains and are widely used. When kickback occurs during brush-cutting operations using conventional bush cutters, the operating rod is readily swept to the left or right by the recoil of the kick back. The operator tightly grips and restrains the wide bar handle with the hands wide apart, whereby the sweeping of the operating rod can be restrained. When the operating rod is swept far to the side, the bar handle is swept along with the operating rod and contacts the body of the operator. The sweep of the operating rod is limited as a result.

However, the configuration of the bar handle is such that the handle extends far from the operating rod in the lateral direction; therefore, usability is limited in mountains, forests, and other terrain that is narrow or steep. On the other hand, loop handles and grip handles are smaller than bar handles and therefore have better usability in narrow or steep terrain, but the small size of the handles also places a significant burden on the operator.

In conventional bush cutters, rotating the cutting blade in the vertical direction is performed by rotating the operating rod, which is positioned to one side of the body.

In contrast, in the present invention, the cutting blade 14 and the operating handle 30 are positioned directly in front of the operator Ma, and therefore the changes in the orientation of the cutting blade 14 that can be made by the operator are constrained. Therefore, in the present invention, the orientation of the cutting blade 14 is made to be changed by changing only the rotational angle of the forward rod-half 61 using the joint 70 provided to the forward rod-half 61, which has the operating handle 30. A loop handle is accordingly employed as the operating handle 30 positioned directly in front of the operator Ma. The loop handle allows the operation for changing the rotational angle of the forward rod-half 61 to be performed much more easily than with a bar handle or a grip handle.

Following is a summary of the description of the weed trimmer 10 of the present invention according to the configuration above.

As shown in FIG. 4, the bush cutter 10 comprises the operating handle 30 in the middle of the operating rod 11 in the longitudinal direction, and has the curved part 11*d*, which is formed from the portion of the operating rod 11 between the operating handle 30 and the motor 13 so as to curve laterally. The size of the curved part 11*d* is set so that there will be no interference with the body Bd of the operator Ma when the cutting blade 14 and the operating handle 30 are positioned in front of the operator Ma, and the motor 13 is positioned directly behind the operator Ma.

The operating rod 11 can be brought nearer the width-wise center Cm of the body Bd by the amount to which the curved part 11*d* circles around the body Bd when the operator Ma performs operations while the bush cutter 10 is suspended from the shoulders Sh. The cutting blade 14 can be oriented in front of the body Bd by bringing the operating rod 11 close to the width-wise center Cm. Bringing the operating rod 11, which extends forwards and backwards, nearer the width-wise center Cm of the body Bd, and orienting the cutting blade 14 in front of the body Bd brings the center of gravity of the bush cutter 10 nearer the width-wise center Cm of the body Bd. As a result, the bush cutter 10 can have better lateral weight balance relative to the body Bd. The operating rod 11 can also be evenly swept to the left and right at a pivoting radius Tr, where the vicinity of the center Cm of the body Bd is the pivot axis. The bush cutter 10 is well-balanced laterally relative to the body Bd, and the operating rod 11 can be readily swept left and right; therefore the operator Ma can perform bush-cutting operations while maintaining a very natural standing work posture. Therefore, the burden on the operator Ma is further lightened, and the efficiency of the operation can be further increased.

The operating rod 11, which extends forwards and backwards, is brought nearer the width-wise center Cm of the body Bd, whereby the operator Ma merely employs a left-right sweeping motion of the body Bd during the bush cutting operation. The efficiency of the operation can therefore be still further increased.

When kickback occurs during the bush-cutting operation, the recoil of the kick back causes the operating rod 11 to pivot left or right around the vicinity of the center Cm of the body Bd as the pivot axis. Since the operating rod 11 pivots about the vicinity of the center Cm of the body Bd, the operator Ma can receive the recoil of the kick back using the entire body Bd. Furthermore, since the operating rod 11 pivots about the vicinity of the center Cm of the body Bd, the cutting blade 14 will not readily approach the body Bd.

The dimension r2 (FIG. 2) of the curved part 11*d* of the bush cutter 10 is set to be large, whereby the center line CL of the bush cutter 10 passing through the motor 13 and the cutting blade 14 can be substantially aligned with the width-wise center Cm of the body Bd of the operator Ma. Therefore, the cutting blade 14 and the operating handle 30 can be positioned directly in front of the operator Ma, and the motor 13 can be positioned directly behind the operator Ma. As a result, the operating rod 11 can be more evenly swept to the left and right, using the center Cm of the body Bd as the pivot axis. Therefore, the efficiency of the operation can be still further increased.

The operating rod 11 of the bush cutter 10 has a two-segment configuration composed of the forward rod-half 61 and the rearward rod-half 62. The operating handle 30 is provided to the forward rod-half 61, and the forward rod-half 61 is rotatably linked to the rearward rod-half 62 via the joint 70. The operator Ma can therefore freely rotate only the forward rod-half 61 and the cutting blade 14 by rotating the operating handle 30 provided to the forward rod-half 61. The forward rod-half 61 and the cutting blade 14 alone can be rotated without rotating the rearward rod-half 62 to which the motor 13 is provided, and therefore the cutting blade 14 can be readily tilted according to ground features. As a result, the efficiency of the operation can be still further increased. The joint 70 may be attached to either the forward rod-half 61 or the rearward rod-half 62.

Having the pair of left and right shoulder belts 40, 40 hung from both of the shoulders Sh, Sh of the operator Ma in the bush cutter 10 of the present invention allows operations to be performed while the bush cutter 10 is suspended. Since the center CL (center line CL) of the operating rod 11 is located in the width-wise center Cm of the body Bd of the operator Ma, the weight of the bush cutter 10 is distributed equally on both of the shoulders Sh, Sh of the operator Ma via the pair of left and right shoulder belts 40, 40. Since the weight of the bush cutter 10 can be borne equally by both of the shoulders Sh, Sh, the burden on the operator Ma can be lightened further, and operability improves.

The curved part 11*d* of the present embodiment is not limited to a bow-shaped bent form as shown in FIG. 2 as long as the size of the curved part is set so as to not interfere with the body Bd of the operator Ma. The curved part 11*d* may also be, e.g., substantially U-shaped or substantially V-shaped when viewed from above.

The motor 13 is not limited to being an engine, as long as the cutting blade 14 is made to rotate. The motor 13 may also be, e.g., an electric motor.

The bush cutter 10 of the present invention is ideal for operations for cutting weeds We (FIG. 3) on or in, e.g., flat terrain, open terrain, footpaths, sloping terrain, mountains, and forests.

Obviously, various minor changes and modifications of the present invention are possible in light of the above teaching. It is therefore to be understood that within the scope of the appended claims the invention may be practiced otherwise than as specifically described.

What is claimed is:

1. A bush cutter comprising:
   an operating rod;
   a motor attached to a rearward end of the operating rod;
   a cutting blade driven to rotate by the motor, the cutting blade being attached to a forward end of the operating rod; and
   an operating handle provided midway along the operating rod in a longitudinal direction,
   wherein the operating rod has, on a portion thereof which is located between the operation handle and the motor, a curved part that is formed to curve laterally, the curved part being dimensioned not to interfere with a body of an operator when the cutting blade and the operating handle are positioned in front of the operator and the motor is positioned directly behind the operator,
   wherein the curved part of the operating rod is formed in an arcuate shape which curves laterally and is separated by a first radius from a portion that is farther to the rear than the operating handle, and
   wherein the curved part is formed in an arcuate shape having a second radius centered above a center line of the bush cutter passing through the motor and the cutting blade so that in use the center line of the bush cutter is substantially aligned with a widthwise center of the operator body.

2. The bush cutter of claim 1, wherein the operating rod has a two-segment configuration comprising a forward rod-half to which the cutting blade is provided and a rearward rod-half to which the motor is provided, and the forward rod-half is provided with the operating handle and is rotatably linked to the rearward rod-half via a joint.

3. The bush cutter of claim 1, wherein the operating handle has a gripping part capable of being gripped by both hands separated by substantially a same distance as a width of a shoulder of the operator.

4. The bush cutter of claim 1, wherein the operating rod has a pair of left and right shoulder belts for hanging on both shoulders of the operator, the left and right shoulder belts being suspended between a rearward part and a part more rearward than the operating handle of the operating rod.

* * * * *